March 16, 1926. 1,577,397
H. K. WHITEHORN
CONTROL OF VEHICLES PROVIDED WITH ELECTRICAL TRANSMISSION
Filed March 24, 1924  3 Sheets-Sheet 3
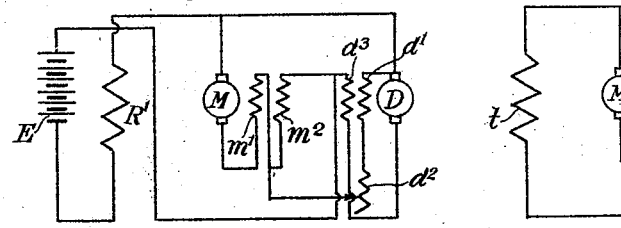
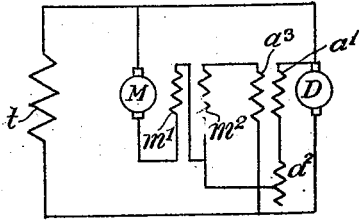
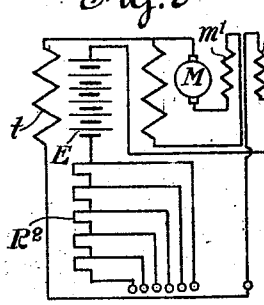
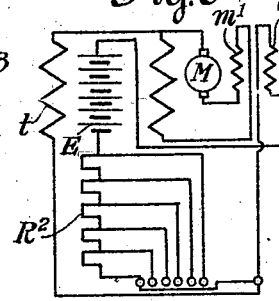
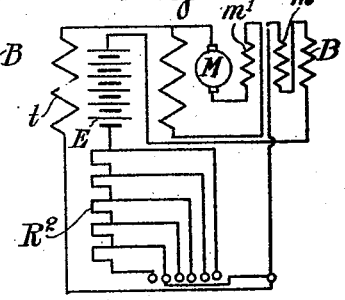
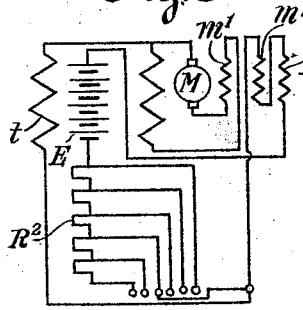
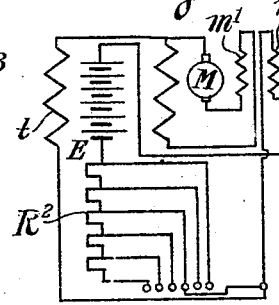
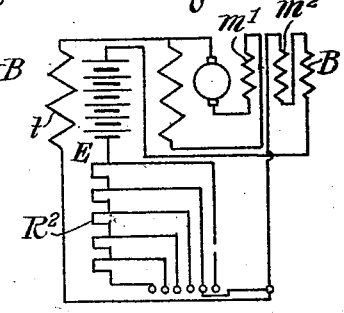
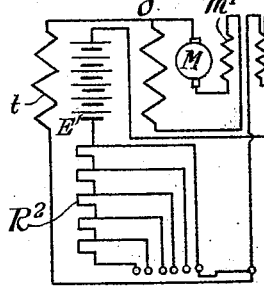
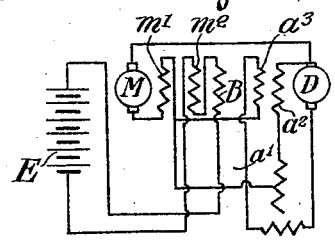
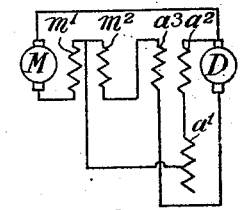
Inventor
H. K. Whitehorn
by _____ atty Patented Mar. 16, 1926.

1,577,397

UNITED STATES PATENT OFFICE.

HAROLD KENNETH WHITEHORN, OF MAIDSTONE, ENGLAND, ASSIGNOR TO TILLING-STEVENS MOTORS LIMITED, OF VICTORIA WORKS, MAIDSTONE, KENT, ENGLAND.

CONTROL OF VEHICLES PROVIDED WITH ELECTRICAL TRANSMISSION.

Application filed March 24, 1924. Serial No. 701,578.

*To all whom it may concern:*

Be it known that I, HAROLD KENNETH WHITEHORN, a British subject, residing at 120 Tonbridge Road, Maidstone, Kent, England, have invented certain new and useful Improvements in the Control of Vehicles Provided with Electrical Transmission, of which the following is a specification.

This invention relates to the control of vehicles, provided with electrical transmission, particularly of the type known as petrol electric, having an engine driving a dynamo to supply power to a motor (or motors), which transmits the power to the driving wheels.

In such vehicles it has been proposed to obtain an electrical braking effect by using the motor as a generator.

An object of the present invention is the utilization of separately excited coils to supply the necessary field when the motor is used as a generator. Preferably such coils are additional to the normal series coils of the machine, and the arrangement is such that during braking the series coils are cut out from the armature circuit and preferably put in series with the separately excited or "braking" coils.

A further object of the invention is to provide a system wherein the number of turns available to excite the field is increased when the machine is used for braking. In this way excessive armature current during braking is avoided, since the load is obtainable by means of higher volts and less current than if the ordinary series coils were used alone for excitation during braking.

In its preferred form the apparatus comprises a shunt or compound wound dynamo which is driven by an internal combustion engine and supplies a series wound motor, which drives the road wheels through a Cardan shaft worm gear and differential. The arrangement is well known and is not specifically illustrated. In addition to the series winding of the motor, braking coils of comparatively small section are provided.

With the above and other objects in view (the nature of which will be better understood from the description hereinafter contained) the invention comprises the improved combinations and arrangements hereinafter claimed and described with reference to the accompanying drawings which illustrate diagrammatically the transmission system and a single controller for carrying out the various connections required.

Figure 1:
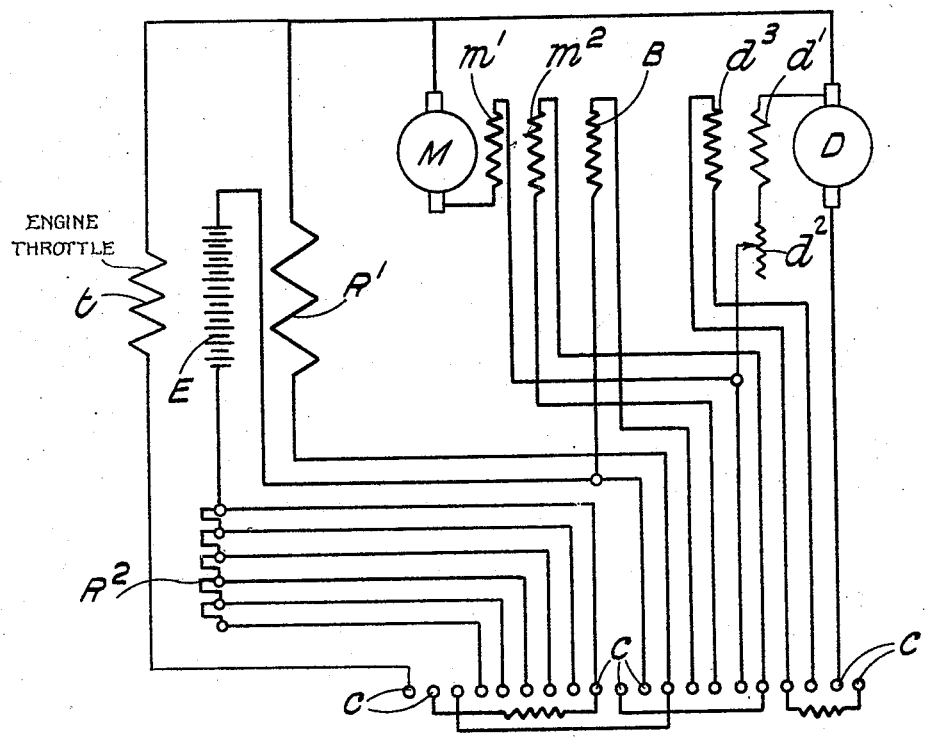
Figure 1:
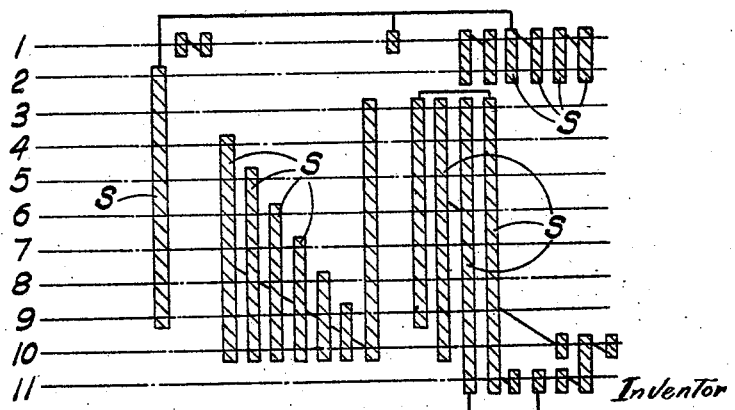
Figure 2:
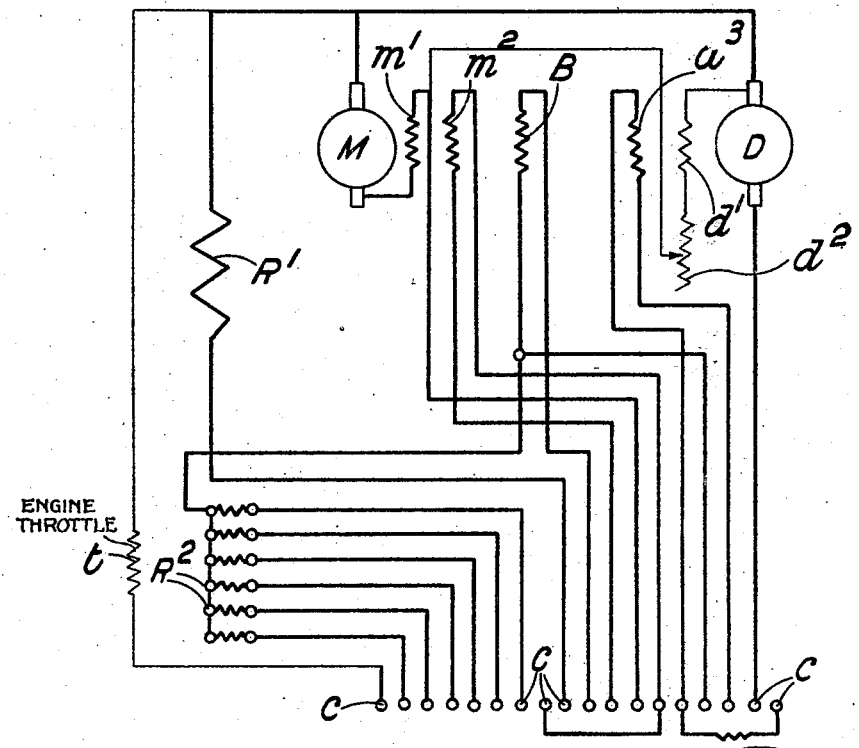
Figure 2:
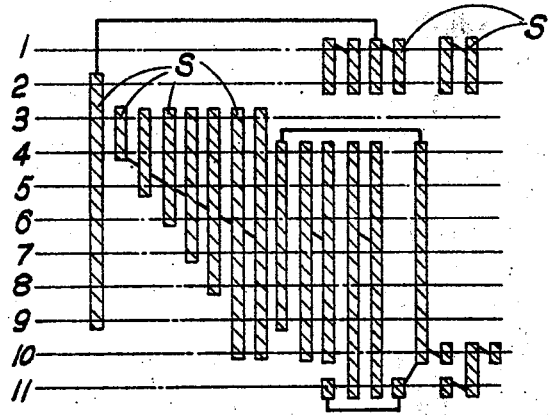

Fig. 1 shows the preferred form in which the braking coils are separately excited, and Fig. 2 shows a modification in which the braking field is excited from the motor armature, during the time when the motor is used as a dynamo for braking. Figs. 3 to 13 inclusive illustrate diagrammatically the circuits established in the respective eleven positions of the controller.

In each figure the dynamo armature D (driven by the engine) is shown with shunt field $d^1$ and shunt regulator $d^2$ and series field winding $d^3$: the motor armature M is shown with interpole winding $m^1$; series field coils $m^2$, and braking coils B of comparatively small section and preferably the same number of turns as, or more turns than, the series coils. A fixed resistance $R^1$ supplies a permanent load for braking and the balance of braking voltage is adjustable by means of resistance $R^2$. A winding $t$ is arranged when energized to close an auxiliary throttle device to slow down or stop the engine before and during braking.

In Figure 1 an exciter battery E is also shown, while in Figure 2 the arrangement is modified in that the motor is still self-exciting when used as a dynamo for braking.

The controller in each case has its fixed contacts represented at $c, c, c$ . . . and drum segments at $s, s, s,$ . . . the connections being easily followed from the diagrams.

Referring particularly to Fig. 3, position 1 of the controller gives the usual connections for forward running; battery E is being charged and braking field B unexcited: in position 2, Fig. 4, the battery is cut out and the winding $t$ excited to slow down or stop the engine: in position 3, Fig. 5, the main dynamo circuit is broken; motor armature M is put across resistance $R^1$; motor field coils $m^2$, braking coils B and battery E are placed in series in an open circuit: in position 4, Fig. 6, the battery excites coils $m^2$ and braking coils B through the maximum resistance of $R^2$: in each of positions 5, 6, 7, 8, and 9, Figs. 7 to 11 respectively, the resistance $R^2$ is reduced by one step, until in position 9 the field is fully excited and the maximum braking effect secured. In position 10 the current from the motor armature is used to drive the dynamo to restart the engine, the auxiliary throttle being opened and the series field winding of the dynamo reversed, see Fig. 12; position 11 gives the standard connections for reversing, the direction of rotation of the motor being reversed, see Fig. 13.

Figure 2 is substantially similar, with the omission of the battery, the braking field being excited by the motor armature, with the normal motor field in series reversed.

The battery may be the normal lighting or starting battery, and it will be clear that in the forms illustrated a single controller effects the whole of the connections necessary to control the electrical and transmission and braking systems.

I claim:—

1. In a vehicle transmission and braking system of the kind set forth, the combination of a driving motor, field coils to excite said motor, connections enabling said motor to be driven and to be employed as a dynamo for braking, and further field coils adapted to excite said motor during braking only, an external resistance forming a braking load, and means to apply and vary the braking effort at the will of the operator.

2. In a vehicle transmission and braking system of the kind set forth, the combination of a driving motor, series field coils to excite said motor during running, separate field coils of comparatively small cross sectional area with reference to that of the said series field coils, means for separately exciting said separate field coils, and control means to connect said separately exciting means for the purpose of exciting said motor as a dynamo for braking.

3. In a vehicle transmission and braking system of the kind set forth, the combination of a motor adapted normally to drive the vehicle and at certain times to be driven thereby, a number of turns of field winding adapted to excite the motor when driving, a further number of turns of field winding adapted to be connected in series with said first-mentioned turns, and means to energize the combined windings to excite the motor to serve as a generator when being driven.

4. In a vehicle transmission and braking system of the kind set forth, the combination of a driving motor, field coils to excite said motor, connections enabling said motor to be driven and to be employed as a dynamo for braking and further field coils adapted to excite said motor during braking only, said further field coils being separately excited, and a control device enabling said connections to be established at the will of the operator for the purpose of checking the speed of the vehicle.

5. In a vehicle transmission and braking system of the kind set forth, the combination of a motor adapted normally to drive the vehicle and at certain times to be driven thereby a number of turns of field winding adapted to excite the motor when driving, a further number of turns of field winding adapted to be connected in series with said first mentioned turns, and separate exciting means to energize the combined windings to excite the motor to serve as a generator when being driven.

6. In a vehicle transmission and braking system of the kind set forth, the combination of a driving motor, field coils to excite said motor, connections enabling said motor to be driven and to be employed as a dynamo for braking, and further field coils adapted to excite said motor, a battery adapted to energize said further field coils during braking, and a control mechanism adapted to cut said battery in or out.

7. In a vehicle transmission and braking system of the kind set forth, the combination of a driving motor, field coils adapted to excite said motor, series connections to some of said coils adapted to be made during driving, separate exciting means, and connections adapted to be made between some of said coils and said separate exciting means, reversing the excitation of said motor and enabling it to be driven as a dynamo to act as a brake.

8. In a vehicle transmission and braking system of the kind set forth, the combination of a dynamo, a driving motor, main electrical connections between said dynamo and motor, field coils for said motor excited during running and additional "braking" field coils for said motor, a controller including movable contacts and fixed contacts, a variable resistance, connections whereby different positions of said controller connect said first-named field coils in series for forward and reverse running, break said main electrical connection and excite said "braking" coils with said variable resistance at its maximum, and reduce said variable resistance by stages until full braking effect is obtained.

9. In a vehicle transmission and braking system of the kind set forth, the combination of the elements claimed in claim 8 with further connections, adapted to slow the dynamo speed before breaking the main electrical connection.

10. In a vehicle transmission and braking system of the kind set forth, the combination of the elements claimed in claim 8 with further connections adapted substantially to stop the dynamo before breaking the main electrical connection and to restart the dynamo.

11. In a vehicle transmission and braking system of the kind set forth, the combination of a dynamo, a driving motor, main electrical connections between said dynamo and motor, field coils for said motor excited during running and additional "braking" field coils for said motor, a controller including movable contacts and fixed contacts, a variable resistance, connections whereby different positions of said controller connect said first-named field coils in series for forward and reverse running, break said main electrical connection and excite said "braking" coils, and means to utilize said variable resistance for gradually increasing the braking effect up to its maximum.

In testimony whereof I affix my signature.

HAROLD KENNETH WHITEHORN.